United States Patent [19]

Mashiko

[11] Patent Number: 4,988,891
[45] Date of Patent: Jan. 29, 1991

[54] SEMICONDUCTOR NEURAL NETWORK INCLUDING PHOTOSENSITIVE COUPLING ELEMENTS

[75] Inventor: Koichiro Mashiko, Hyogo, Japan

[73] Assignee: Mitsubishi Denki Kabushiki Kaisha, Tokyo, Japan

[21] Appl. No.: 406,651

[22] Filed: Sep. 13, 1989

[30] Foreign Application Priority Data

May 9, 1989 [JP] Japan .................. 1-116516

[51] Int. Cl.[5] .............................. G06G 7/16
[52] U.S. Cl. ...................... 307/201; 350/333; 364/513; 364/713
[58] Field of Search ............... 350/333; 364/513, 713, 364/807; 307/201

[56] References Cited

U.S. PATENT DOCUMENTS

| 4,602,850 | 7/1986 | DeBenedetti | 350/333 |
| 4,607,344 | 8/1986 | Athale et al. | 364/513 |
| 4,731,747 | 3/1988 | Denker | 307/201 X |
| 4,782,460 | 11/1988 | Spencer | 307/201 X |
| 4,804,250 | 2/1989 | Johnson | 364/513 |
| 4,874,963 | 10/1989 | Alspector | 307/201 |
| 4,904,882 | 2/1990 | Szu | 307/201 X |

FOREIGN PATENT DOCUMENTS

2176281 12/1986 United Kingdom .

OTHER PUBLICATIONS

Wagner & Psaltis, "Multilayer Optical Learning Networks", *SPIE*, vol. 752, Distal Optical Computing, 1987, pp. 86–97.
Graf, et al, "VLSI Implementation of Neutral Network Model", *Computer*, Mar. 1988, pp. 41–49.
1984 Image Electronics Society National Conference, The Precedings Lecture No. 14, Jun. 1984, pp. 1–4.
The Precedings of 83 Image Electronics Society, Study Meeting, 1985, Article No. 84–05-2, pp. 1–6.

*Primary Examiner*—David Hudspeth
*Attorney, Agent, or Firm*—Lowe, Price, LeBlanc, Becker & Shur

[57] ABSTRACT

A semiconductor neural network constructed in accordance with models of vital nerve cells has photosensitive elements as coupling elements providing degrees of coupling between neurons which are modeled vital nerve cells. The conductance values of the photosensitive elements can be set by light. Due to such structure, not only the degrees of coupling of all the coupling elements can be simultaneously programmed but signal lines for programming the degrees of coupling can be eliminated in the network, whereby a semiconductor neural network having a high degree of integration can be implemented without additional complicating fabrication steps.

13 Claims, 12 Drawing Sheets

THRESHOLD FUNCTION

SIGMOID FUNCTION

200: SEMICONDUCTOR CHIP (a) NO CHARGE OR $f_H$ APPLIED (HOMOGENEOUS ARRAY)

(b) $f_L$ APPLIED (HOMEOTROPIC ARRAY) : PRINCIPLE OF OPERATION OF GH LIQUID CRYSTAL

PROPERTY OF TWO-FREQUENCY DRIVING LIQUID CRYSTAL (a) OFF STATE (BRIGHT)

(b) ON STATE (DARK)

SEMICONDUCTOR NEURAL NETWORK INCLUDING PHOTOSENSITIVE COUPLING ELEMENTS

BACKGROUND OF THE INVENTION

1. Field of the Invention

The present invention relates to a semiconductor neural network, and more particularly, it relates to structure for improving integration density of a semiconductor neural network.

2. Description of the Background Art

In recent years, various electronic circuits have been modeled on human nerve cells (neurons). One of such neuron models is called a Hopfield model. This Hopfield model is now briefly described.

FIG. 1 schematically shows the structure of a unit which is modeled on a neuron. This unit i includes an input part A which receives signals from other units k, j, and the like, a conversion part B which converts the received inputs along a predetermined rule and an output part C which outputs the results of conversion. The input part A has weights (synapses) W showing strengths of connection between the respective units. Thus, a weight Wik is added to a signal Sk from the unit k, which is transmitted to the conversion part B. Each weight W can take a positive value, a negative value or zero. The conversion part B outputs the sum net of the inputs S, to which the weights W are added, through a predetermined function f. An output $S_i$ from the unit i at a time t is provided as follows:

$$\left. \begin{array}{l} Ui(t) = \text{net}(i) = \sum_j WijSj \\ Si = f[Ui(t)] \end{array} \right\} \quad (1)$$

A threshold function shown in FIG. 2A or a sigmoid function shown in FIG. 2B is generally employed a the function f.

The threshold function shown in FIG. 2A is a unit step function which outputs "1" when the sum net(i) of the inputs exceeds a predetermined threshold value $\theta$, while otherwise outputting "0".

The sigmoid function shown in FIG. 2B is a nonlinear, monotonously increasing function which is expressed as:

$$f = 1/[1 + \exp(-\text{net}(i))]$$

This sigmoid function, which is in a range of zero to 1, approaches "0" as the sum net(i) of the inputs decreases, while approaching "1" as the sum net(i) increases. This sigmoid function outputs "0.5" when the sum net(i) is "0".

A predetermined threshold value $\theta$ may be added to the aforementioned sigmoid function, thereby to use a function which is expressed as:

$$f = 1/[1 + \exp(-\text{net}(i) + \theta)]$$

The aforementioned unit is modeled on a vital cell which receives stimuli from other neuron to generate an output or to fire when the sum of the stimuli exceeds a given value. The Hopfield model provides an operating model of a network which is formed by a plurality of such neurons.

When initial states are supplied to respective neuron units in the aforementioned equations (1), the states of the respective neuron units are thereafter entirely determined in principle by simultaneously applying the aforementioned two dynamic equations (1) to all the neuron units and solving the same. If the number of the units increases, however, it is almost impossible to examine and grasp the states of the respective units one by one for programming weight and bias values in order to provide optimum solutions to target problems. Therefore, Hopfield introduces an energy function which is defined as:

$$E = -(\tfrac{1}{2}) \sum_{i,j} WijSiSj - \sum_i IiSi$$

as a quantity expressing the property of the overall system (neural network) in place of the states of the respective units. Symbol Ii represents a self-bias value which is specific to a unit i. Hopfield has indicated that, when a weight (synapse load) Wij is symmetrical as Wij=Wji, each unit changes its state to regularly minimize the aforementioned energy function to the local minimum, and proposed to apply this model to programming of the weight Wij. The model having the aforementioned energy function is called a Hopfield model. The aforementioned model is generally expressed as follows:

$$Ui(n) = \sum_j WijSj(n) + Ii$$
$$Si(n + 1) = F[Ui(n)]$$

as a discrete time model. Symbol n represents a discrete time. Hopfield himself has indicated that this Hopfield model is realized particularly in high accuracy when the slope of the function f showing input/output characteristics is abrupt (a function approximate to a unit step function with which almost all outputs take values close to "0" or "1").

A neural network is constructed in a VLSI (very large scale integrated circuit) in accordance with the Hopfield model, as disclosed in "Computer", a magazine issued by IEEE (Institute of Electrical and Electronics Engineers), March 1988, pp. 41–49, for example.

FIG. 3 schematically shows overall structure of a conventional neural network integrated circuit. Referring to FIG. 3, the conventional neural network integrated circuit includes a resistive matrix 100 which is formed by an array of resistive coupling elements having prescribed weights and an amplifier 101 which amplifies potentials on data input lines included in the resistive matrix 100 and feeds back the amplified signals to input parts of the resistive coupling elements. The resistive matrix 100 includes data input lines and data output lines which are arrayed orthogonally to the data input lines, as hereinafter described in detail. Interconnection states of the data input lines and the data output lines through the resistive coupling elements are programmable.

A row decoder 102 and a bit decoder 103 are provided in order to program the states of the respective resistive coupling elements included in the resistive matrix 100, i.e., the interconnection states between the data input lines and the data output lines. The row decoder 102 selects a row of the resistive matrix 100, while the bit decoder 103 selects a column thereof.

The circuit further includes an input/output data register 104 which temporarily latches input/output data, a multiplexer 105 which connects the input/output data register 104 to the data input lines or the data output lines included in the resistive matrix 100 in response to a data write/read mode and an interface (I/O) 106 for connecting the input/output data register 104 to the exterior of the circuit, in order to input or output data. This neural network is integrated on a semiconductor chip 200. FIG. 4 illustrates exemplary structure of the resistive matrix 100 shown in FIG. 3.

Referring to FIG. 4, the resistive matrix 100 includes data input lines A1 to A4 and data output lines B1 and $\overline{B1}$, B2 and $\overline{B2}$, B3 and $\overline{B3}$, and B4 and $\overline{B4}$. Resistive coupling elements 1 are provided on respective crosspoints of the data input lines A1 to A4 and the data output lines B1 and $\overline{B1}$ to B4 and $\overline{B4}$. The resistive coupling elements 1 can enter open, excitatory and inhibitory states. The states of the resistive coupling elements 1 can be programmed from the exterior for an applied problem. While those being in the open states are shown with no resistance marks in FIG. 4, the resistive coupling elements 1 are provided in all the crosspoints between the data input lines and the data output lines. The resistive coupling elements 1 transmit potential levels on the corresponding data output lines onto the corresponding data input lines in accordance with the programmed states respectively.

The input lines A1 to A4 are respectively provided with amplifier circuits C1 to C4 which amplify the data on the corresponding data input lines and transmit the same onto the corresponding data output lines. Each of the amplifier circuits C1 to C4 has two inverting amplifiers 2a and 2b, which are connected in series with each other. The inverting amplifier 2a inverts the potential on an input line Ai and transmits the same onto an output line Bi. The inverting amplifier 2b transmits the data on the input line Ai onto an output line $\overline{Bi}$.

Each of the coupling elements 1 connects the output of an amplifier Ci to the input of another amplifier Cj. FIG. 5 shows exemplary structure of each coupling element.

Referring to FIG. 5, the resistive coupling element 1 includes resistor elements R+ and R−, switching elements S1, S2, S3 and S4 and random access memory cells 150 and 151. An end of the resistor element R+ is connected to a source potential $V_{DD}$. An end of the resistor element R is connected to another source potential $V_{SS}$. The switching element S1 is on-off controlled by the output of the inverting amplifier 2b. The switching element S2 is on-off controlled by information stored in the random access memory cell 150. The ON/OFF state of the switching element S3 is set by information stored in the random access memory cell 151. The switching element S4 is on-off controlled by the output of the inverting amplifier 2a.

The storage contents of the random access memory cells 150 and 151 can be programmed from the exterior. Although not clearly shown in FIG. 4, word lines W1 and W2 for row selection and bit lines BL for column selection are arranged for respective ones of the random access memory cells 150 and 151, for selection by the row decoder 102 and the bit decoder 103 shown in FIG. 3. Thus, such word lines WL and bit lines BL are arrayed in parallel with the data input lines Ai and data output lines Bi in the resistive matrix 100, respectively.

In the structure shown in FIG. 5, the output of the amplifier circuit Ci directly supplies no current to the corresponding input line. Thus, output load capacitance of the amplifier Ci is reduced. The resistor elements R+ and R− are current limit resistors. The coupling element 1 can enter one of three states in accordance with program states of the random access memory cells 150 and 151. The three states include an excitatory connection state in which the switching element S2 is in an ON state (active state), an inhibitory connection state in which the switching element S3 is in an active state (ON state) and an open connection state in which both of the switching elements S2 and S3 are in inactive states (OFF states). When potential levels of the output lines Bi and of the amplifier circuit C match with the programmed connection state of a given resistive coupling element 1, a current flows to the corresponding input line Ai from either the source potential $V_{DD}$ or the other source potential (ground potential $V_{SS}$. When the resistive coupling element 1 is programmed in the open connection state, no current is transmitted to the input line Ai regardless of the output state of the amplifier circuit Ci.

When the aforementioned circuit model is associated with a neuron model, the amplifier circuit Ci corresponds to a neuron body (conversion part B in FIG. 1). The interconnections A1 to A4, B1 to B4 and $\overline{B1}$ to $\overline{B4}$ correspond to the data input and output line structure parts (dendrites and axons) shown in FIG. 1. The resistive coupling elements 1 correspond to the synapse load parts provided between the neurons for adding weights. The operation is now briefly described.

The model shown in FIG. 4 is often called a connectionist model. In this model, each neuron unit (amplifier circuit Ci) merels thresholds an input signal, i.e., outputs a signal which is responsive to the value of the input signal with respect to a predetermined threshold value. Each resistive coupling element 1 connects the output of a given amplifier circuit Ci to the inputs of other amplifier circuits Cj. Thus, the state of each amplifier circuit Ci is determined by the states of all the remaining amplifier circuits Cj. When a given amplifier circuit Ci detects the current of a corresponding input line Ai (i=1 to 4), the output of the amplifier circuit Ci is provided as follows:

$$V\text{out}(i) = f\left(\sum_j I_j\right)$$
$$= f(\sum_j (V\text{out}(j) - V\text{in}(i))W_{ij})$$

where Vin(i) and Vout(i) represent input and output voltages of the amplifier circuit Ci which is connected to the data input line Ai, Ii represents a current flowing in one resistive coupling element 1 and Wij represents conductance of the resistive coupling element connecting the amplifier circuit Ci, which is connected to the data input line Ai, with the amplifier circuit Cj, which is connected to the data input line Aj. The output voltage Vout(i) of each amplifier circuit Ci is provided by the transfer characteristic of the amplifier circuit Ci itself. The voltage of the input line Ai of a given amplifier circuit Ci is provided by the sum of currents flowing into the input line Ai. This voltage is adjusted to a value where the total current is zero. That is, the total energy of this electronic network is minimized at this time. The output of the amplifier Ci at that time supplies the output data.

Each amplifier circuit Ci is formed by a CMOS inverter, for example, the input impedance of which is high and has the aforementioned nonlinear, monotonously increasing threshold function. In this case, the following relation holds from the aforementioned condition that the total current is zero:

$$\sum_i I_{ij} = \sum_i V_{ij}/R_{ij} = 0 \quad (2)$$

where symbol Iij represents a current flowing in the resistor of the resistive coupling element which is controlled by the output of the amplifier circuit Ci connected to the input line Ai. Symbol Δ Vij represents potential difference across the resistive coupling element, which potential difference is provided as follows:

$$\Delta V_{ij} = V_{in(j)} - V_{DD} \quad \text{... (excitatory connection)}$$
$$= V_{in(j)} - V_{SS} \quad \text{... (inhibitory connection)}$$

Symbol Rij represents resistance of the resistive coupling element, which resistance is provided as R+ or R−. Thus, the voltage Vin(i) is the total sum of all outputs of the amplifier circuits which are connected to the data input lines Ai.

The above is analog calculation, which is performed within the resistive matrix 100 in a parallel manner. However, both the input and output data are digital data. Actual arithmetic operation is now briefly described with reference to FIG. 4.

The neural network is initialized when input data are supplied onto the respective input lines A1 to A4 through the register 10, so that the input lines A1 to A4 are charged at values corresponding to the input data.

Output potentials of the amplifier circuits C1 to C4 are first changed in response to the charging potentials supplied to the input lines A1 to A4. Such potential changes on the data output lines are fed back to the data input lines A1 to A4 through corresponding resistive coupling elements. The potential levels fed back to the respective data input lines A1 to A4 are determined by program states of the respective resistive coupling elements 1. When a given resistive coupling element 1 is programmed in excitatory connection, a current flows from the source potential $V_{DD}$ to an input line Ai. When the resistive coupling element 1 is programmed in an inhibitory connection state, on the other hand, a current flows into the data input line Ai from the ground line $V_{SS}$. Such operations progress in a parallel manner except for resistive coupling elements which are in open connection states so that currents flowing into a given data input line Ai are added up in an analog manner thereby to change the potential at the data input line Ai. When such potential change of the data input line Ai exceeds the threshold voltage of a corresponding amplifier circuit Ci (inverting amplifiers 2a and 2b), the output potential of this amplifier circuit Ci is changed. Such a state is repeated and the outputs of the amplifier circuits Ci are so changed as to satisfy the aforementioned condition that the total current is zero. The state of the network is finally stabilized to satisfy the aforementioned equation (2) for the stabilized state.

After the state of the neural network is stabilized, the output voltages of the respective amplifier circuits Ci are stored in a register (register 10 or a separately provided output register; register 104 in FIG. 3) and thereafter read out. A decision of the stabilized state of the neural network is set by a predetermined time after data input, or made by directly comparing register values stored in the output register with each other wherein, a decision is made that the neural network is stabilized when difference between the compared output data reaches a prescribed value, to obtain the output data.

As described above, data minimizing the energy of the neural network are outputted as the output data. The resistive matrix 100 stores certain patterns or certain data in accordance with the program states of the resistive coupling elements 1. The neural network, which can decide match/mismatch of the stored patterns or data and input data, also functions as an associative memory or a pattern discriminator.

Structure known as a single-layer perceptron circuit is obtained by removing feedback paths from the data output lines Bi and $\overline{Bi}$ to the data input lines Aj from the resistive matrix 100 shown in FIG. 4. This perceptron circuit, which develops various algorithms, can be multi-layered to construct a flexible system.

In the aforementioned conventional neural network, the connection strengths of the coupling elements are programmed by writing data in the random access memory cells provided in the coupling elements. In order to write the data in the respective random access memory cells, there are required row and column selecting lines (word lines and bit lines) for selecting the memory cells, signal lines for transmitting control signals for writing the data in the memory cells and the like. Such row and column selecting lines and control signal lines must be provided independently of the data input/output lines of the neural network itself. As understood from FIG. 5, the respective memory cells are coupled with the data input/output lines of the neural network through the switching elements, and not directly coupled with the same. Thus, an area occupied by signal interconnections in the resistive matrix part is increased to significantly obstruct improvement in density of integration of the semiconductor neural network.

It may be considered to multi-layer the row and column selecting lines and the data input/output lines of the neural network, thereby to reduce the interconnection area. In this case, however, the fabrication process is complicated to lead to reduction in fabrication yield.

When the aforementioned random access memory cells are employed, further, a long period of time is required to program the states of the coupling elements since it is impossible to simultaneously write desired data in all memory cells.

On the other hand, a solid state scanning element such as a solid state image pickup element is known as a device for optically reading and processing image information. As shown in FIG. 6A, such a solid state image pickup element is formed by a matrix of photodiodes which serve as light receiving elements and MOS (metal-insulating film-semiconductor) transistors which serve as switching elements for reading signal charges of the photodiodes.

Referring to FIG. 6A, each photodiode is formed by a P-type semiconductor layer 255 which is epitaxially grown on an N-type semiconductor substrate 250 and an N+-type semiconductor impurity region 251 which is formed on a prescribed region of the P-type semiconductor layer 255. Each MOS transistor for detecting the signal charge stored in the photodiode is formed by a thin insulating film 254 of $SiO_2$ or the like formed on the P-type semiconductor layer 255, a gate electrode 253 of polysilicon or the like and an N+-type impurity region 252 which is connected to a signal line S. The gate electrode 253 of polysilicon, for example, is connected to a control signal line (vertical scanning line) G. FIG.

6B illustrates a equivalent circuit of the photo detector shown in FIG. 6A.

A photodiode PD is reverse-biased and generates a photoelectric current when it is supplied with light. The generated photoelectric current is transmitted onto a signal line S by bringing a corresponding switching element SW into an ON state.

In such a solid state image pickup element, each photodiode and each MOS transistor form one pixel as shown in FIGS. 6A and 6B, and such pixels are arrayed to form a matrix. The control signal line G, which is also called a vertical scanning line, simultaneously brings vertically arrayed pixels into ON states. The signal line S is provided in correspondence to horizontally arrayed pixels, so that a row of horizontally arrayed pixels are simultaneously selected by the control signal line G and transmitted onto the signal line S are pixel data.

FIG. 7 schematically illustrates the structure of a solid state scanning element having a row of a photodiode array PDA. Referring to FIG. 7, the solid state scanning element includes the photodiode array PDA, which is formed by n photodiodes PD1 to PDn. The respective photodiodes PD1 to PDn are provided with switching transistors SW1 to SWn for transmitting data onto a signal line S. A shift register SR is provided to sequentially bring the switching transistors SW1 to SWn into ON states through control signal lines G1 to Gn thereof in response to two-phase, non-overlapping clock signals $\phi$ and $\bar{\phi}$, in order to sequentially read out data from the photodiode array PDA. This shift register SR enters an operating state in response to a starting pulse $\phi$s, and sequentially brings signal potentials at the control signal lines G1 to Gn to high levels one by one in response to the clock signals $\phi$ and $\bar{\phi}$. Thus, the data stored in the photodidoes PD1 to PDn included in the photodiode array PDA are sequentially read out on the signal line S.

This solid state scanning element cannot simultaneously read out the signal charges of all the photodiodes although all the photodiodes can simultaneously receive optical pattern information, and hence the data are read out in a serial manner. Thus, the solid state scanning element cannot process information at a high speed.

SUMMARY OF THE INVENTION

An object of the present invention is to eliminate the aforementioned disadvantages of the conventional neural network and provide an improved semiconductor neural network, which is suitable for high integration and capable of programming connection strengths (connection states) at a high speed.

Another object of the present invention is to provide a semiconductor neural network comprising a resistive matrix which can reduce an occupied area of interconnections thereby to enable high densification.

Still another object of the present invention is to provide coupling elements, whose connection states (connection strengths) can be programmed at a high speed with no necessity for signal lines such as row and column selecting lines required for programming the connection states of the coupling elements.

The semiconductor neural network according to the present invention includes photosensitive elements, whose conductance values are changed upon irradiation with light, as coupling elements.

The semiconductor neural network according to the present invention further includes means for applying optical patterns for programming connection states of coupling elements, which are formed by photosensitive elements, onto a connection matrix.

The coupling elements according to the present invention includes first photosensitive elements for providing excitatory connection and second photosensitive elements for providing inhibitory connection. The first photosensitive elements are coupled to a first source potential. The second photosensitive elements are coupled to a second source potential.

The coupling elements provided in the semiconductor neural network according to the present invention are brought into either conducting states or cutoff states by irradiation with light. Thus, the connection states of the coupling elements are programmed by the patterns of the applied light, whereby no interconnections such as row and column selecting lines for programming the connection states (connection strengths) are required and the interconnection area is reduced.

Further, the connection states (connection strengths) of all the coupling elements can be simultaneously programmed by the patterns of the applied light, and hence the connection states can be programmed at a high speed.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
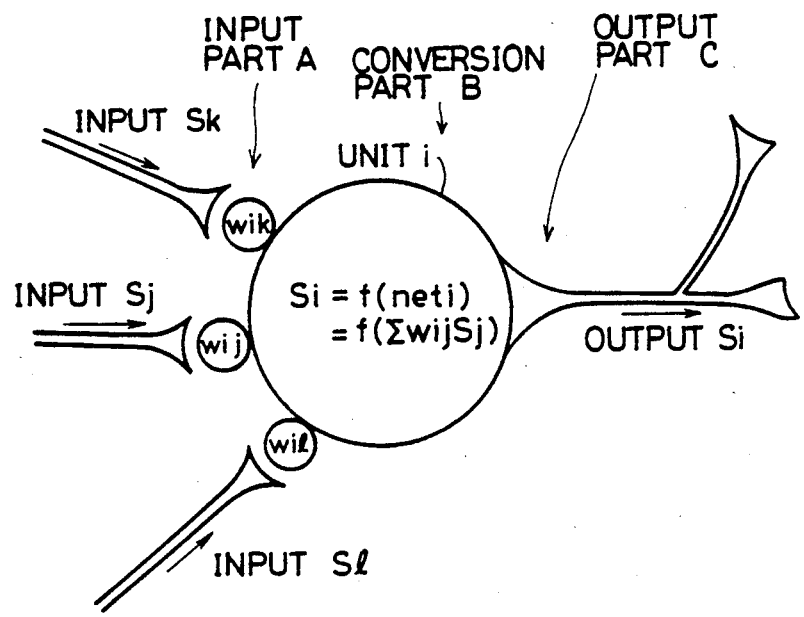
FIG. 1 illustrates the principle of a neural network.
Figure 2A:
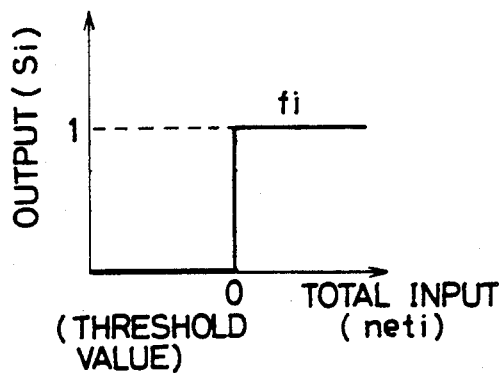
FIGS. 2A and 2B illustrate exemplary input/output conversion functions in neuron units.
Figure 2B:
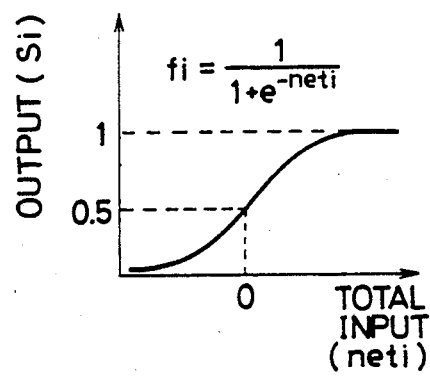
Figure 3:
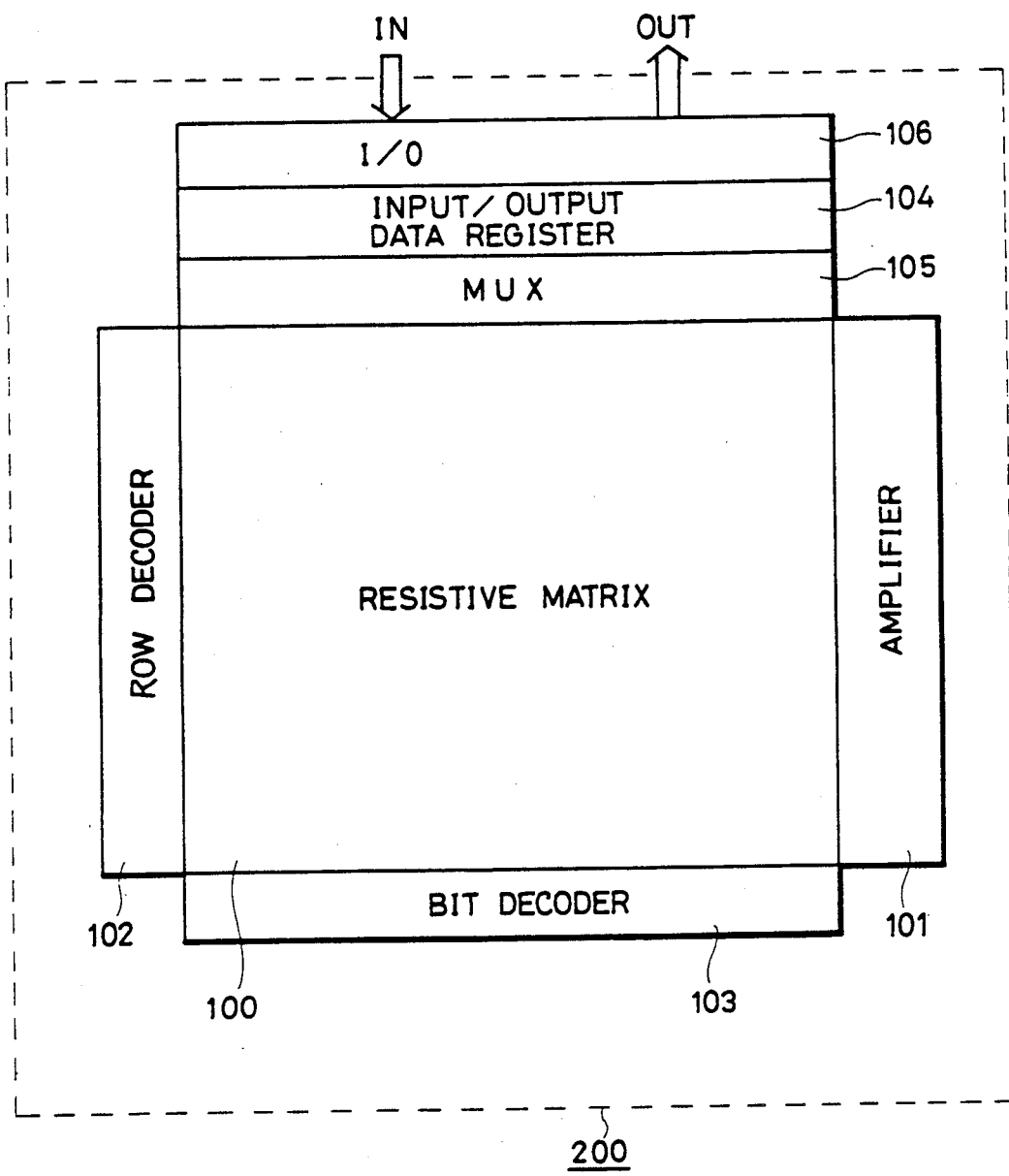
FIG. 3 schematically illustrates overall structure of a conventional semiconductor neural network.
Figure 4:
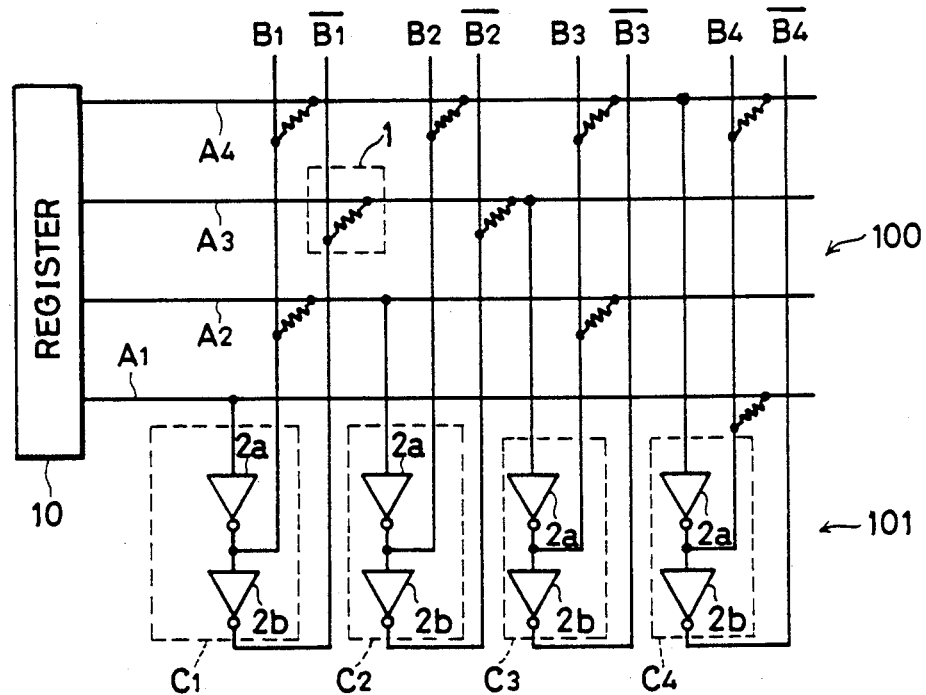
FIG. 4 illustrates the structure of an essential part of the conventional neural network.
Figure 5:
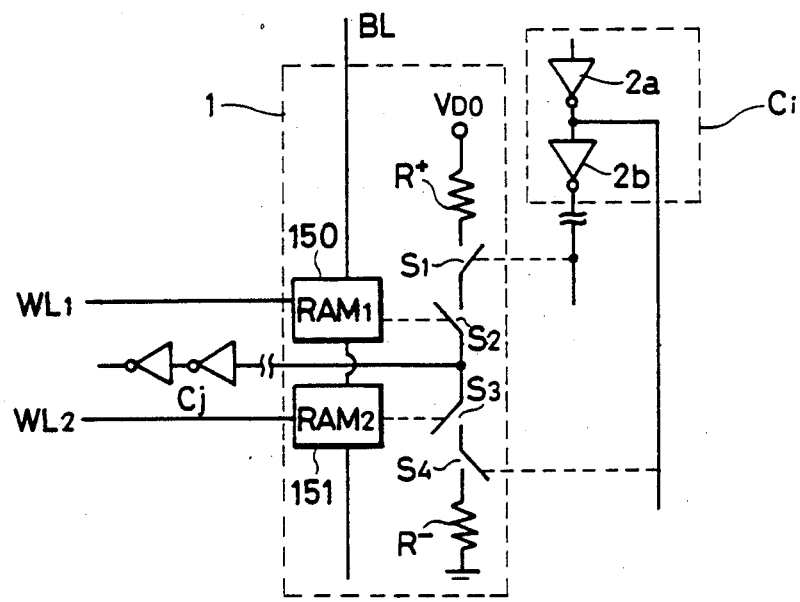
FIG. 5 schematically shows the structure of a coupling element employed in the conventional semiconductor neural network.
Figure 6A:
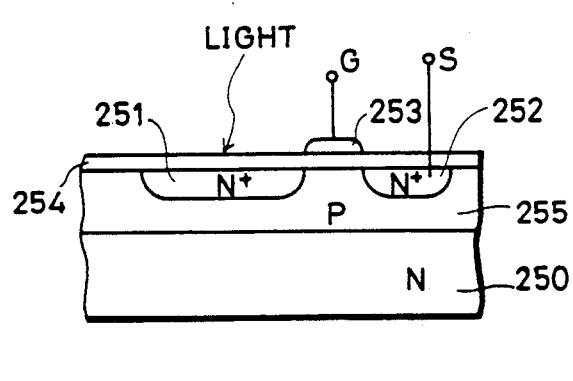
FIGS. 6A and 6B schematically illustrate the structure of a photocell in a solid state scanning element employing conventional photodiodes.
Figure 6B:
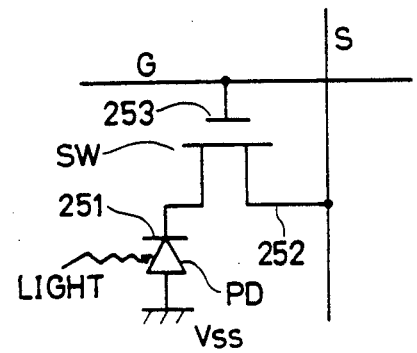
Figure 7:
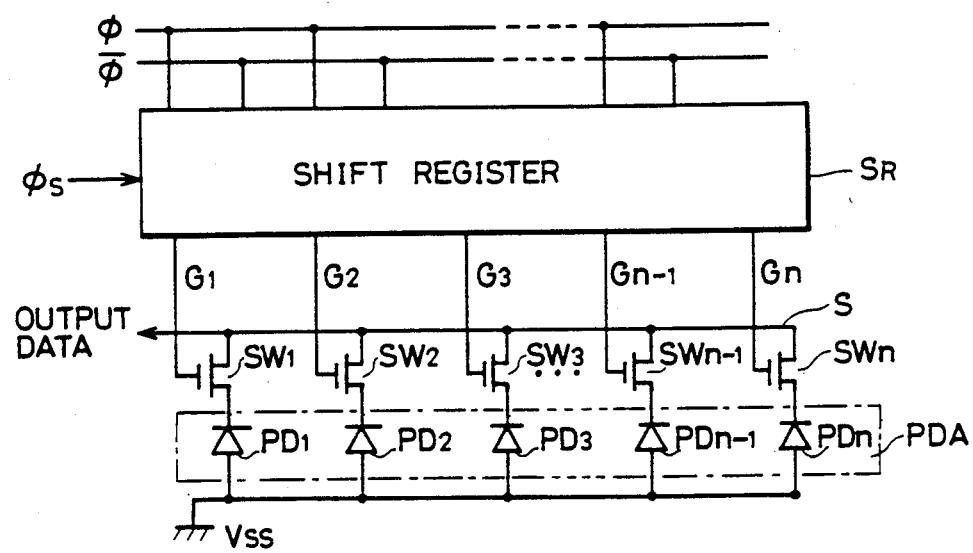
FIG. 7 schematically illustrates the structure of an essential part in a data reading part of the conventional solid state scanning element.
Figure 8A:
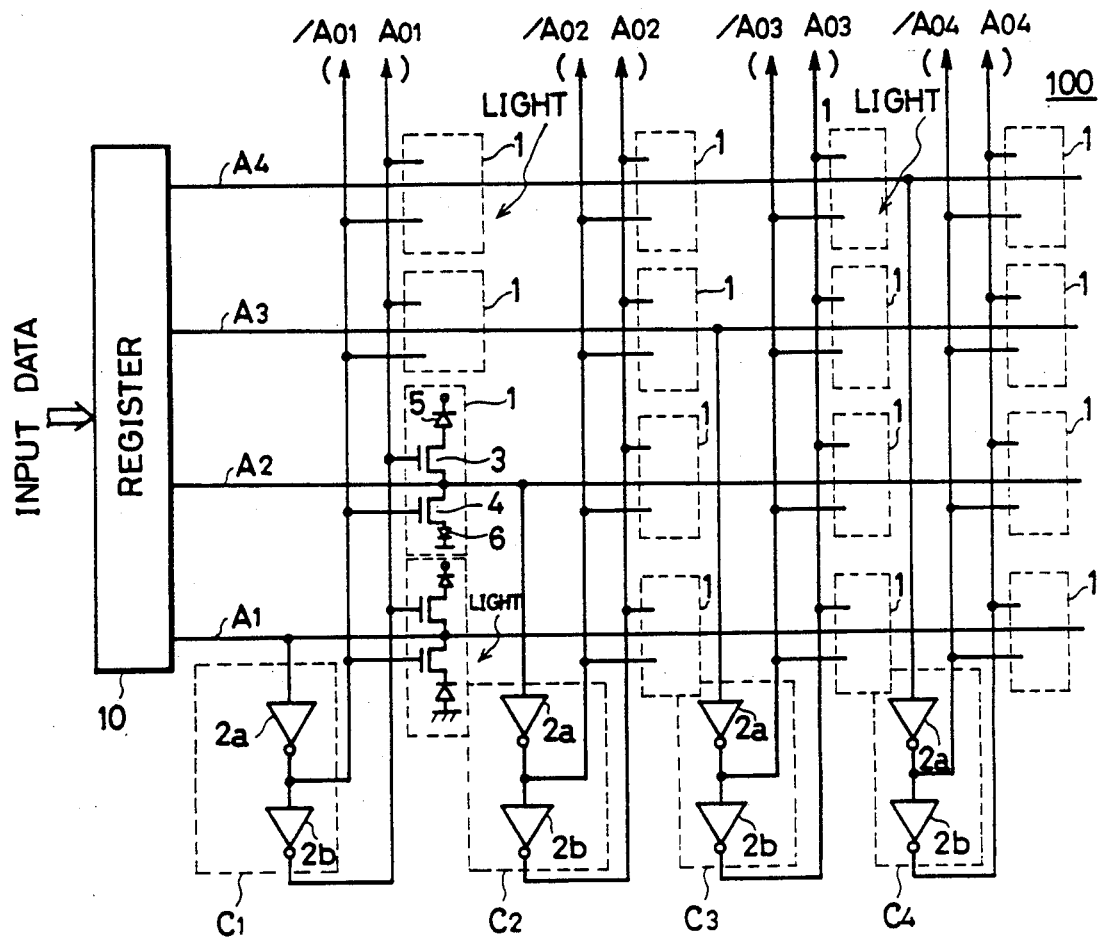
FIG. 8A schematically illustrates the structure of a connection matrix of a semiconductor neural network according to an embodiment of the present invention and the associated circuits.
Figure 8B:
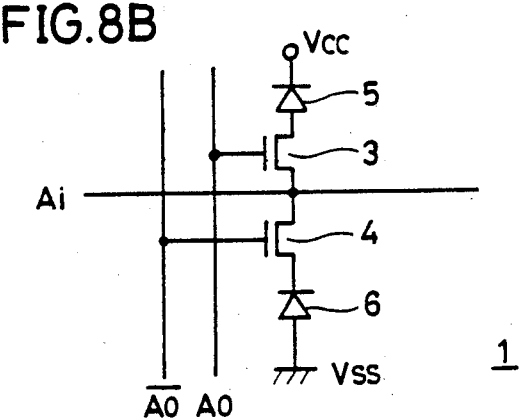
FIG. 8B illustrates a coupling element shown in FIG. 8A in an enlarged manner.

FIGS. 8A and 8B illustrate the structure of a resistive matrix of a semiconductor neural network according to an embodiment of the present invention and part relating thereto. Portions corresponding to those of the conventional semiconductor neural network shown in FIG. 4 are indicated by the same reference numerals in FIG. 8A.

Referring to FIG. 8A, the semiconductor neural network according to the embodiment of the present invention includes data input lines Al to A4 which receive input data from a register 10, complementary data output line pairs AO1 and $\overline{AO1}$ to AO4 and $\overline{AO4}$ which are arrayed to intersect with the data input lines A1 to A4, and coupling elements which are arranged on respective crosspoints between the data input lines Al to A4 and the data output lines AO1 and $\overline{AO1}$ to AO4 and $\overline{AO4}$. Amplifier circuits C1 to C4 are provided in correspondence to respective ones of the data input lines Al to A4. Each of the amplifier circuits C1 to C4 comprises a pair of series-connected inverting amplifiers 2a and 2b. Each of the inverting amplifiers 2a and 2b has a finite threshold value. complementary amplifying signals of an amplifier circuit Ci are transmitted onto corresponding data output lines AOi and $\overline{AOi}$.

As shown in FIG. 8B in an enlarged manner, each coupling element 1 comprises photodiodes 5 and 6 and N-channel MOS (metal-insulating film-semiconductor) transistors 3 and 4. The photodiode 5 has a cathode which is connected to a first source potential $V_{CC}$ and an anode which is connected to the source of the N-channel MOS transistor 3. The MOS transistor 3 has a gate connected to a data output line $\overline{AO}$ and a drain connected to a data input line Ai. The MOS transistor 4 has a drain connected to the data input line Ai and a gate connected to a data output line AO. The photodiode 6 has a cathode connected to the source of the MOS transistor 4 and an anode connected to a second source potential (ground potential) $V_{SS}$. Both of the photodiodes 5 and 6 are reverse-biased and enter conducting states upon irradiation with light, to supply current flow. Therefore, when light is selectively applied to a part of the connection matrix shown in FIG. 8A, only the photodiodes irradiated with the light provide current flow from the source potential $V_{CC}$ or $V_{SS}$, thereby to program the connection matrix of the neural network. An excitatory state is defined when the photodiode 5 is irradiated with light and an inhibitory state is defined when the photodiode 6 is irradiated with light, while an open state is defined when both the photodiodes 5 and 6 are irradiated with no light. A state in which both of the photodiodes 5 and 6 are irradiated with light is generally called a "blind following" state.

When optical patterns defining connection strengths of the coupling elements 1 are previously applied to respective ones of the photodiodes provided on the resistive matrix 100 in operation, conducting/nonconducting states of the respective photodiodes are determined in response to the applied optical patterns. Thereafter input data are applied to the input data lines Al to A4 from the input register 10, so that potential levels of the respective data lines Al to A4 go to values corresponding to the input data. Then the respective ones of the amplifier circuits Cl to C4 are activated, so that the signal potentials of the input signal lines Al to A4 are transmitted onto the data output lines AOi and $\overline{AOi}$ through the amplifier circuits C1 to C4. The state data transmitted onto the data output lines AOi and $\overline{AOi}$ are transmitted to the respective coupling elements 1. In accordance with match/mismatch of polarity of each complementary data output line pair AOi and $\overline{AOi}$ and the program state (excitatory, inhibitory or open state) of each coupling element 1, the input signal line Ai is charged from the source potential $V_{CC}$, discharged to the second source potential $V_{SS}$ or remains unchanged. Such operation is executed in the connection matrix 100 in a large scale in parallel and analog manners. Consequently, the potentials at the data output lines AOi and $\overline{AOi}$ are asserted to bring the neural network into a minimum energy state by combination of the states of input data and the program states of the respective coupling elements 1 of the connection matrix 100. This is an example of operation of the neural network. When such a large scale parallel arithmetic is performed through software processing by a large computer, the efficiency is reduced since a long time is required for calculating the sum of products for obtaining respective states of a large-scale matrix and it is necessary to study all of respective energy states in order to obtain the minimum energy value. According to the present invention, however, such arithmetic processing can be performed at a high speed.

Further, since it is possible to simultaneously program the connection states of all coupling elements by simply irradiating the same with light, the connection states of the respective coupling elements can be programmed at a high speed.

In addition, the connection states of the respective coupling elements are programmed by irradiating the photodiodes with light, whereby no signal lines are required in order to program the states of the respective photodiodes and the interconnection area can be extremely reduced.

Figure 9:
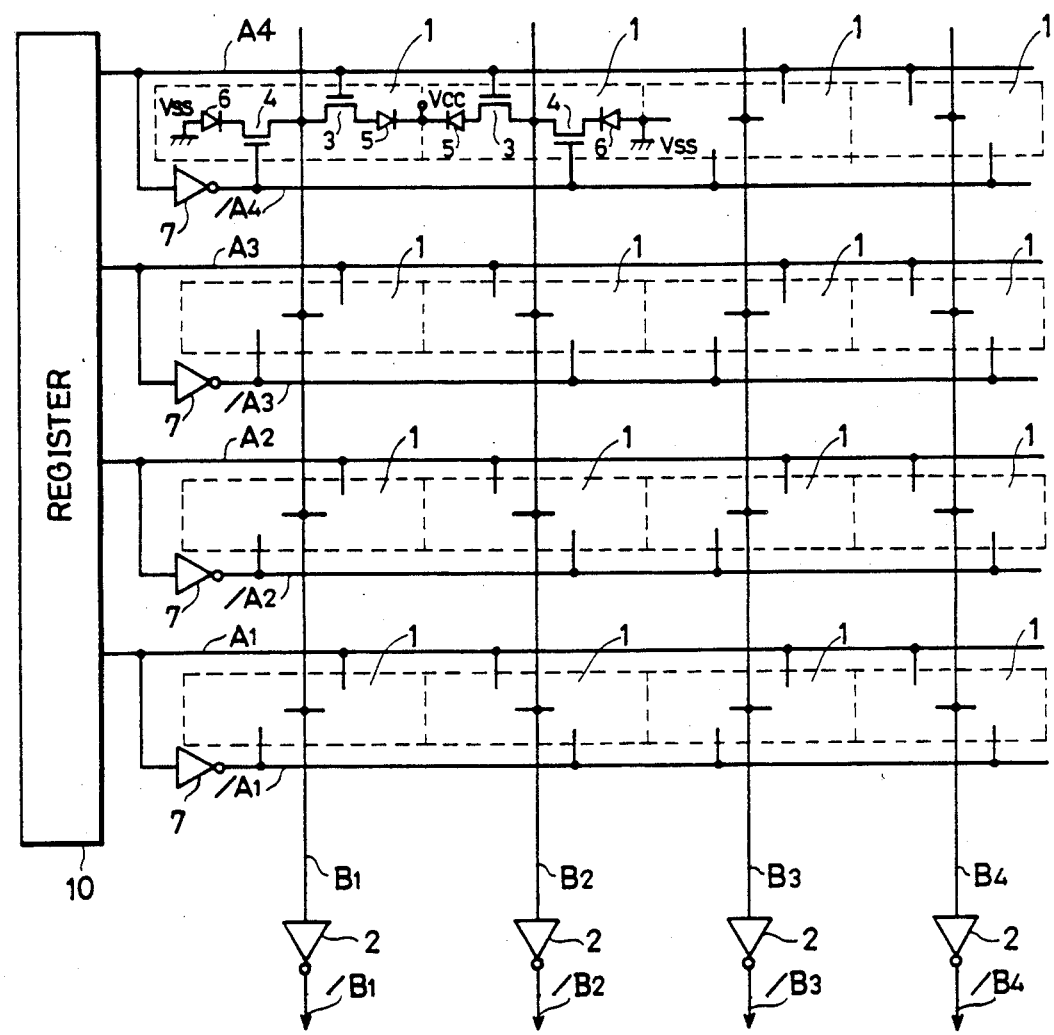
FIG. 9 illustrates the structure of an essential part of a semiconductor neural network according to another embodiment of the present invention.

FIG. 9 schematically illustrates a connection matrix part of a semiconductor neural network according to another embodiment of the present invention. FIG. 9 shows a single-layer perceptron circuit, which is a neural network having no signal feedback from output lines to input lines. Referring to FIG. 9, this network includes complementary data input line pairs A1 and $\overline{A1}$ to A4 and $\overline{A4}$ and internal data transmission lines B1 to B4. In order to transmit complementary data to the complementary input data line pairs A1 and $\overline{A1}$ to A4 and $\overline{A4}$, inverting amplifiers 7 are provided in correspondence to respective ones of the data input lines A1 to A4. On the other hand, inverting amplifiers 2 are provided in correspondence to respective ones of the internal data transmission lines B1 to B4. Outputs of the inverting amplifiers 2 are transmitted to data output lines to $\overline{B1}$ to $\overline{B4}$ respectively. Each coupling element 1 is similar in structure to that shown in FIG. 8B. However, MOS transistors 3 and 4 are connected to the same internal data transmission lines Bi. The MOS transistor 3 enters an ON state in response to the potential on a data input line Ai, to connect a photodiode 5 to an internal data transmission line Bi. The MOS transistor 4 enters an ON state in response to the potential on a complementary data input line $\overline{A4}$, to connect a photodiode 6 to an internal data transmission line Bi.

In the structure of the neural network shown in FIG. 9, the potential of each internal data transmission line Bi is determined in an analog manner by combination of the program state of the coupling element 1 and the signal potentials on the data input line pair Ai and $\overline{Ai}$. This analog potential on the internal data transmission line Bi is thresholded by the inverting amplifier 2 having a finite threshold voltage, and converted to a digital signal.

This perceptron circuit, whose learning algorithm is established as a back propagation algorithm, is known as a flexible network having simple circuit structure. A more flexible neural network can be constructed by multi-layering the perceptron circuit shown in FIG. 9.

Figure 10:
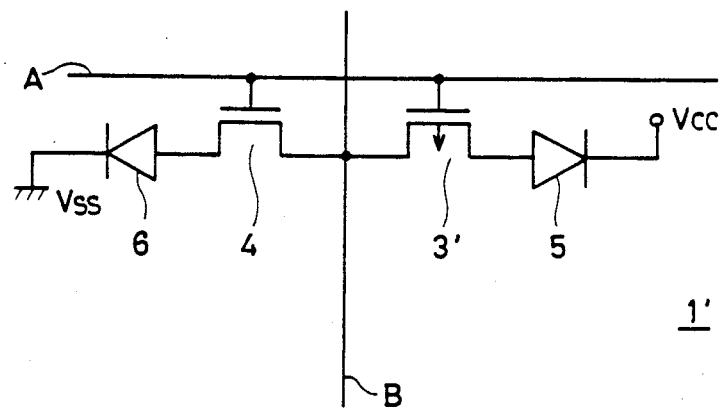
FIG. 10 illustrates another exemplary structure of a coupling element employed in a semiconductor neural network according to still another embodiment of the present invention.

FIG. 10 illustrates a modification of each coupling element shown in FIG. 9. Referring to FIG. 10, a coupling element 1' has a P-channel MOS transistor 3', which substitutes for the N-channel MOS transistor 3. Due to such modification, a single data input line can be employed in place of a complementary pair of input lines. Thus, the area of the connection matrix part can be further reduced by reduction of the interconnection area and removal of the inverting amplifiers 7, thereby to increase the density and capacity of the neural network chip.

Figure 11:
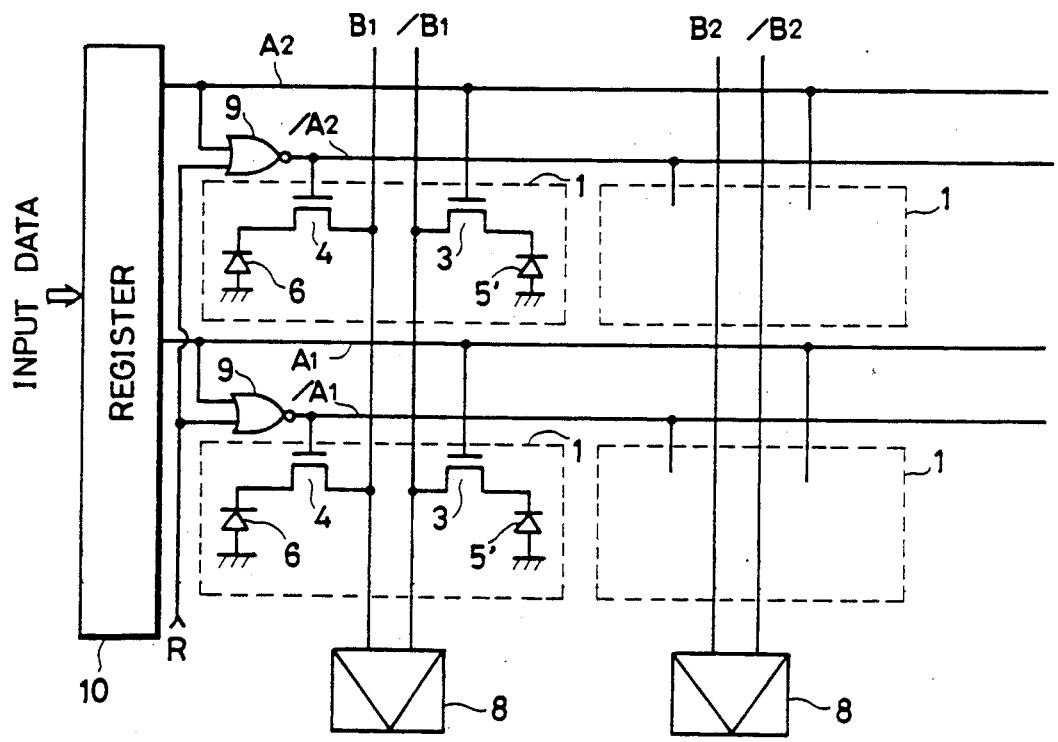
FIG. 11 schematically illustrates the structure of an essential part of a semiconductor neural network according to a further embodiment of the present invention.

FIG. 11 schematically illustrates the structure of a connection matrix part of a semiconductor neural network according to still another embodiment of the present invention. Referring to FIG. 11, the connection matrix includes complementary data input line pairs Ai and $\overline{Ai}$ and complementary data output line pairs Bi and $\overline{Bi}$. Each data input line $\overline{Ai}$ is provided with a NOR gate 9, which receives a signal R in its one input while receiving an output from a register 10 in its another input. The signal R defines active and inactive states of the semiconductor neural network. This signal R goes low when the neural network is in an active state, while the same goes high when the neural network is in an inactive state. Therefore, when the neural network enters an active state, the NOR gate 9 functions as an inverter and inverts input data from the register 10 to transmit the same onto the input data line $\overline{Ai}$. When the neural network is in an inactive state, on the other hand, the NOR gate 9 holds the data line $\overline{Ai}$ at a low level.

Each coupling element 1 includes an N-channel MOS transistor 4 and a photodiode 6 providing connection between the complementary data input line $\overline{Ai}$ and the data output line Bi, and an N-channel MOS transistor 3 and a photodiode 5' providing connection between the data input line Ai and the complementary data output line $\overline{Bi}$. Both of the photodiodes 5' and 6 have anodes connected to a ground potential $V_{SS}$. According to such structure, no interconnection is required to supply a first source potential $V_{CC}$, and the interconnection area can be reduced.

According to the structure of the coupling elements shown in FIG. 11, further, the connection matrix can be formed only by the N-channel MOS transistors and the photodiodes which are connected to the ground potential $V_{SS}$, whereby the fabrication process can be simplified. In addition, no power supply line is provided in order to supply the source potential $V_{CC}$, so that interconnection for supplying the ground potential $V_{SS}$ is adjacent to no source potential supply line. Thus, no malfunction is caused by potential variation due to capacitance coupling between power source and ground interconnections.

Figure 12:
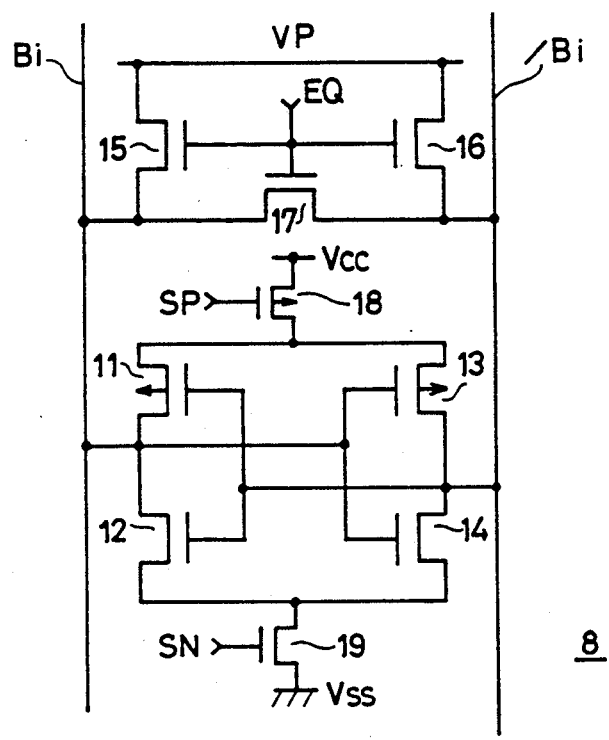
FIG. 12 illustrates exemplary specific structure of an amplifier circuit shown in FIG. 11.

In the structure of the coupling elements shown in FIG. 11, an excitatory state is defined when the photodiode 5' is irradiated with light and an inhibitory state is defined when the photodiode 6 is irradiated with light, while an open state is defined when both of the photodiodes 5' and 6 are irradiated with no light. FIG. 12 shows the structure of an amplifier 8 for amplifying the potentials on the data output lines Bi and $\overline{Bi}$.

Referring to FIG. 12, the amplifier 8 includes an equalizer circuit portion and a differential amplifier circuit portion. The equalizer circuit portion includes N-channel MOS transistors 15, 16 and 17. The MOS transistor 15 enters an ON state in response to an equalize signal EQ, and transmits a predetermined. precharge potential $V_P$ onto a data output line $\overline{Bi}$. The MOS transistor 16 enters an ON state in response to the equalize signal EQ, and transmits the precharge voltage $V_P$ onto a complementary data output line Bi. The MOS transistor 17 enters an ON state in response to the equalize signal EQ, to short-circuit the data output lines Bi and $\overline{Bi}$.

The differential amplifier circuit portion includes P-channel MOS transistors 11 and 13 and N-channel MOS transistors 12 and 14. The P-channel MOS transistor 11 and the N-channel MOS transistor 12 are complementarily connected to form a first CMOS inverter. The P-channel MOS transistor 13 and the N-channel MOS transistor 14 are complementarily connected to form a second CMOS inverter. Input/output portions of the first and second CMOS inverters are cross-connected with each other. The input portion of the first CMOS inverter, which is formed by the MOS transistors 11 and 12, is connected to the complementary data output line $\overline{Bi}$, and the output portion thereof is connected to the data output line Bi. The input portion of the second CMOS inverter, which is formed by the MOS transistors 13 and 14, is connected to the data output line Bi, and the input portion thereof is connected to the complementary data output line $\overline{Bi}$.

In order to activate the differential amplifier circuit, provided are a P-channel MOS transistor 18 which enters an ON state in response to an activating signal SP and connects a source potential $V_{CC}$ to the differential amplifier circuit portion and an N-channel MOS transistor 19 which enters an ON state in response to another activating signal SN and connects the differential amplifier circuit portion to a ground potential $V_{SS}$.

The operation of the semiconductor neural network shown in FIG. 11 is now described. The signal R goes low to activate the neural network. Then, the register 10 transmits input data onto the data input lines Ai and $\overline{Ai}$, so that the potentials on the respective data input lines Ai and $\overline{Ai}$ are charged or discharged in response to the input data respectively. Such potential changes on the data input lines Ai and $\overline{\text{Ai}}$ bring either the MOS transistor 3 or 4 included in each coupling element into an ON state. Thus, either the data output line Bi or $\overline{\text{Bi}}$ is discharged in response to the program state of the coupling element.

The operation of the amplifier circuit 8 shown in FIG. 12 is now described with reference to FIG. 11 and FIG. 13 which is an operation waveform diagram thereof. Before a time t1, both of the equalize signal EQ and the signal R are at high levels and the neural network is inactive. At this time, the data output lines Bi and $\overline{\text{Bi}}$ are precharged at the predetermined precharge potential $V_P$.

At a time t1, the equalize signal EQ and the signal R fall to low levels, whereby the neural network is activated and the data output lines Bi and $\overline{\text{Bi}}$ enter high impedance states.

At a time t2, the register 10 transmits data to change the signal potentials on the data input lines Ai and $\overline{\text{Ai}}$. Such changes are transmitted onto the data output lines Bi and $\overline{\text{Bi}}$ in accordance with the program state of each coupling element 1. Thus, the signal potentials on the data output lines Bi and $\overline{\text{Bi}}$ are charged or discharged (only discharged in the structure shown in FIG. 11) in accordance with the program state of the coupling element 1.

The activating signal SN rises and the activating signal SP falls at a time t3, so that the amplifier circuit 8 is activated. Thus, potential difference on the output signal lines Bi and $\overline{\text{Bi}}$ is differentially amplified.

Figure 13:
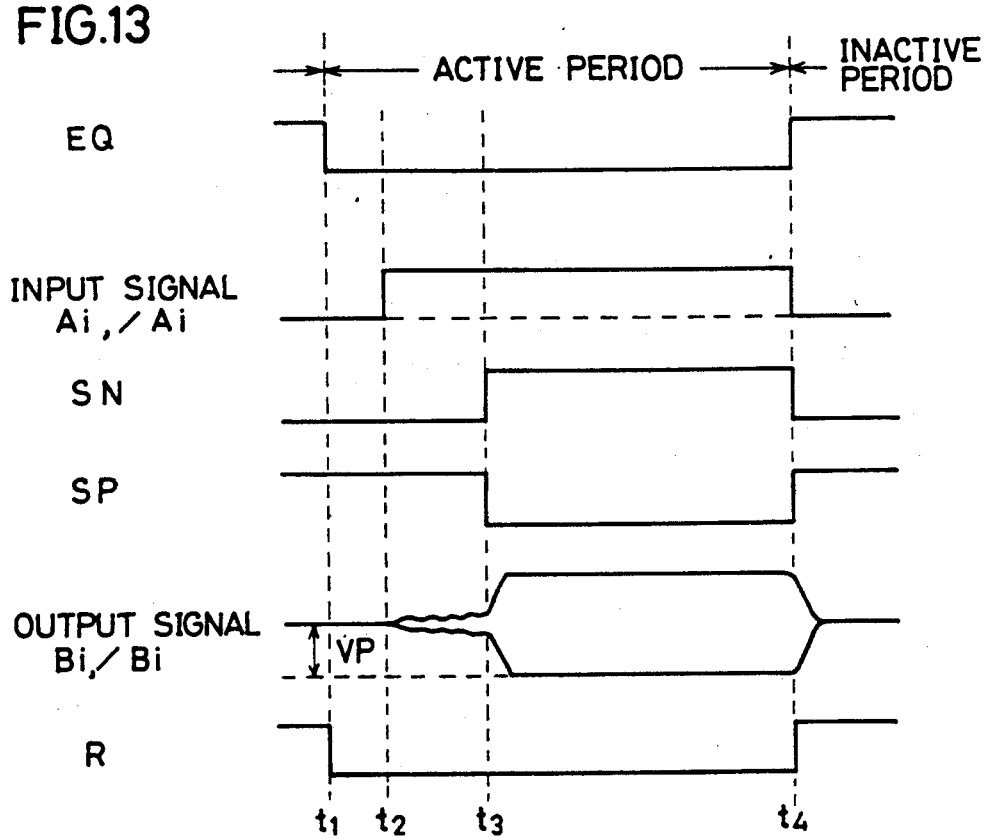
FIG. 13 is a signal waveform diagram showing the operation of the differential amplifier shown in FIG. 12.

In the operation waveform diagram shown in FIG. 13, the activating signals SN and SP are simultaneously changed to activating states at the time t3. However, the activating signals SN and SP may be different from each other in timing for transition to the activating states.

After the signal potentials on the data output lines Bi are $\overline{\text{Bi}}$ read out, the equalize signal EQ, the signal R and the amplifier activating signal SP rise to high levels respectively and the amplifier activating signal SN falls to a low level, whereby the neural network enters an inactive state.

The reference potential $V_P$ precharged by the equalizer circuit formed by the transistors 15 to 17 is varied with strucrtures the connection matrix. When only discharge to the ground potential $V_{SS}$ takes place as in the coupling element shown in FIG. 11, for example, no further change of state is caused after the potentials of the output signal line pair Bi and $\overline{\text{Bi}}$ are discharged to the ground potential $V_{SS}$ by discharge currents. Therefore, it is desirable to set the reference potential $V_P$ at a value approximate to the source potential $V_{CC}$ level, to suppress such discharge to the ground potential $V_{SS}$.

Further, if there is such possibility that both of charge and discharge of the data output lines or the internal data transmittion lines take place as in the coupling elements shown in FIGS. 8A, 8B and 9, it is preferable to set the reference potential $V_P$ at an intermediate potential level between the source potential $V_{CC}$ and the ground potential $V_{SS}$ as shown in the signal waveform of FIG. 13, to provide margins with respect to both potential changes to the source potential $V_{CC}$ and the ground potential $V_{SS}$.

A method of programming connection strengths of a photodiode matrix is now described.

Figure 14:
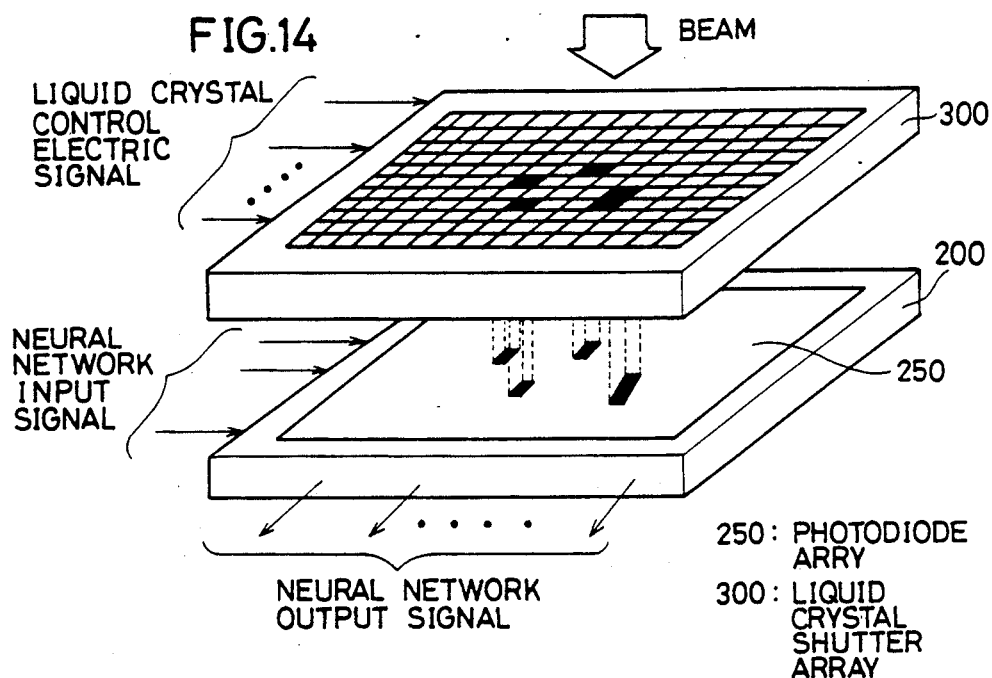
FIG. 14 schematically illustrates arrangement for programming a connection matrix of the semiconductor neural network according to the present invention.

FIG. 14 schematically illustrates structure employing a liquid crystal shutter array. In the liquid crystal shutter structure, which is widely applied to a printer or the like, light transmittance of a liquid crystal member is locally changed by an electric signal. Referring to FIG. 14, a liquid crystal shutter array 300 has such structure that liquid crystal elements are opposed to respective ones of photodiodes provided in a photodiode array (within a connection matrix 100) which is arranged on a semiconductor neural network chip 200. The connection states of the respective photodiodes are programmed by electrically controlling light transmittance of the liquid crystal member. Operation of a liquid crystal is now briefly described.

Figure 15A:
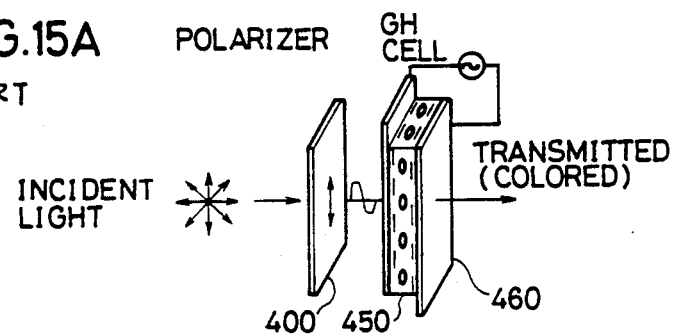
FIGS. 15A to 15C are diagrams for illustrating the operation of a GH type liquid crystal cell.

A guest-host (GH) type structure is a known liquid crystal element. The liquid crystal element is driven by alternating voltage in order to prevent deterioration caused by electrochemical reaction. A two-frequency driving scheme utilizing a dielectric dispersion property of the liquid crystal material is known as a high-speed driving scheme for the liquid crystal material (refer to Article No. 84-05-2, The Precedings of 83 Image ELECTRONICS SOCIETY, Study Meeting 1985, and 1984 Image Electronics Society National Conference, the Precedings Lecture No. 14, June 1984, for example). The principle of operation of the guest-host type liquid crystal is now described with reference to FIGS. 15A and 15B. As shown in FIG. 15A, when a high-frequency electric field fH or no electric field is applied to a liquid crystal cell 450, molecular axes of dyes contained in the liquid crystal cell 450 are arrayed in the same direction as those of liquid crystal molecules, as the liquid crystal molecules are homogeneously arranged. Incident light passing through a polarizer 400 is polarized int eh same direction as the alignment of the molecule array. Thus, the incident light passing through the polarizer 400 is colored which has light components specific to the dyes contained in the liquid crystal molecules absorbed. When the optical wavelength property of the incident light is matched with light absorption wavelength properties of the dyes, the incident light is absorbed by the dyes and hardly transmitted through the liquid crystal cell 450, whereby a dark state (shutter-off state) can be obtained.

Figure 15B:
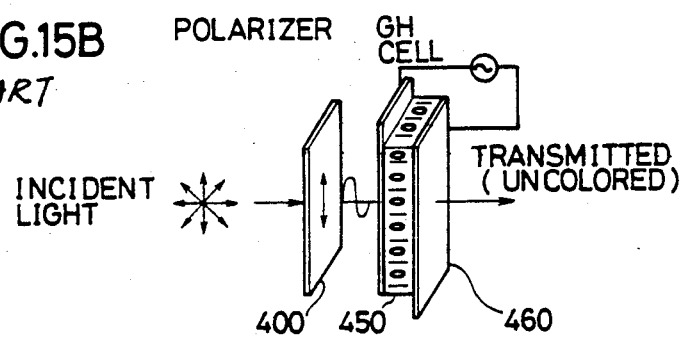
Figure 15C:
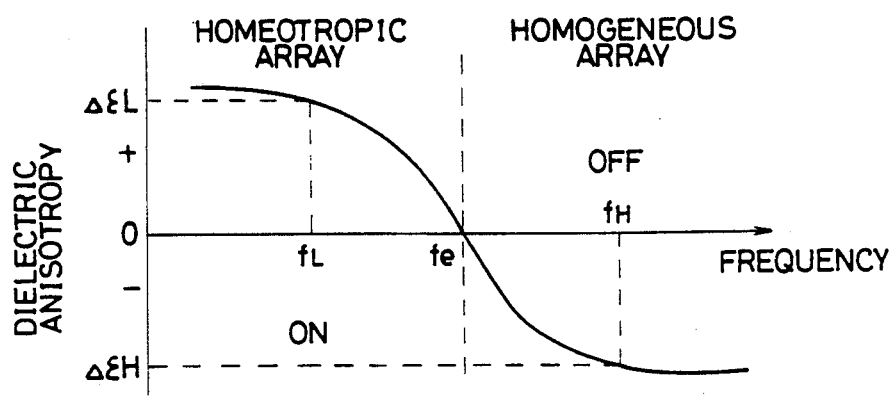

When a low-frequency electric field fL is applied across electrodes 460 of the liquid crystal cell 450 as shown in FIG. 15B, on the other hand, the molecules of the liquid crystal cell 450 are homeotropically arranged while the molecular axes of the dyes are also arrayed in the same direction as those of the liquid crystal molecules. Incident light passing through the polarizer 400, which is polarized orthogonally to the direction of array of the liquid crystal molecules and the dyes, is transmitted through the liquid crystal cell 450 with no absorption by the dyes (shutter-on time). As shown in FIG. 15C, the liquid crystal molecules exhibit negative dielectric anisotropy and are homogeneously arrayed at the frequency fH which is higher than a cross frequency fc, while the same exhibit positive dielectric anisotropy and are homeotropically arrayed at the frequency fL which is lower than the cross frequency fc. Thus, a liquid crystal array can be set in an ON or OFF state by applying a predetermined electric field to the liquid crystal array.

A twisted nematic (TN) type liquid crystal is also known in addition to the aforementioned guest-host type liquid crystal. The principle of operation of the TN type liquid crystal is now briefly described with reference to FIGS. 16A and 16B.

Figure 16A:
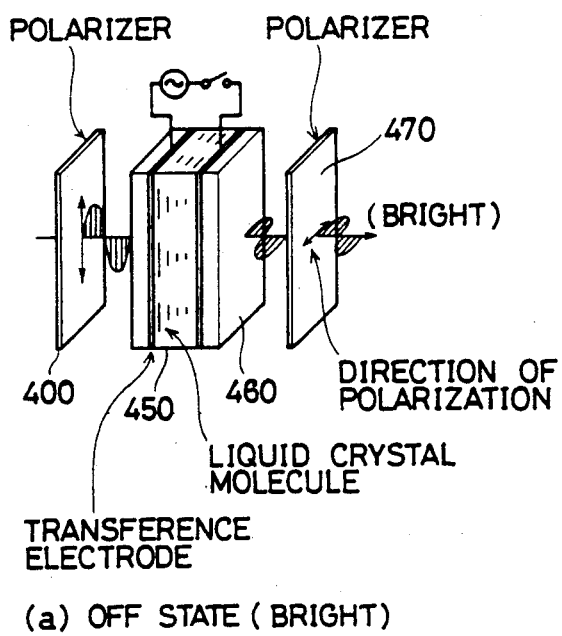
FIGS. 16A and 16B are diagrams for illustrating the operation of a TN type liquid crystal cell.

Referring to FIG. 16A, operation in an OFF state is now described. Light transmitted through a polarizer 400 is polarized only in one direction. When no electric field is applied to a liquid crystal cell 450, the direction of orientation of the liquid crystal molecules is twisted by 90° between transparent electrodes 460. The light transmitted through the polarize 400, whose plane of polarization is therefore rotated by 90° along the molecule orientation of the liquid crystal cell 450, is supplied to another polarizer 470. The transmissive polarization direction of the polarizer 470 is provided orthogonally to that of the polarizer 400. Therefore, the light transmitted through the liquid crystal cell 450 passes through the polarizer 470, to obtain a bright state.

Figure 16B:
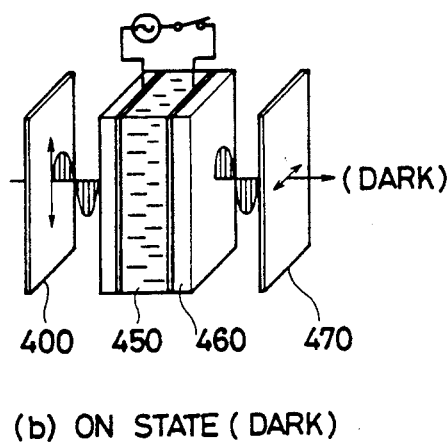

When, on the other hand, an alternating electric field is applied to the transparent electrodes 460 as shown in FIG. 16B, the liquid crystal molecules of the liquid crystal cell 450 are rearranged in the direction of the applied electric field, and no twisting is caused in the direction of molecule orientation. Therefore, light passing through the polarizer 400 cannot pass through the polarizer 470 since the plane of polarization thereof is not changed upon passage through the liquid crystal cell 450. Thus, a dark state is obtained.

The liquid crystal of the aforementioned type is called a normally open liquid crystal. When directions of polarization of the two polarizers 400 and 470 are parallel to each other, a state reverse to the above is attained. A liquid crystal of this type is called a normally close liquid crystal. Since a liquid crystal is formed of an organic compound, liquid crystal cells can be readily arrayed in one-to-one correspondence to photodiodes of the photodiode matrix 250. Thus, the respective photodiodes of the photodiode array 250 can be simultaneously programmed by employing such liquid crystal shutter structure.

Other than the aforementioned liquid crystal, known is a chiral smectic C liquid crystal which exhibits ferroelectricity. Such a ferroelectric liquid crystal, which is known having high speed responsibility and memory property, can be similarly employed as a material for a liquid crystal shutter array.

Figure 17:
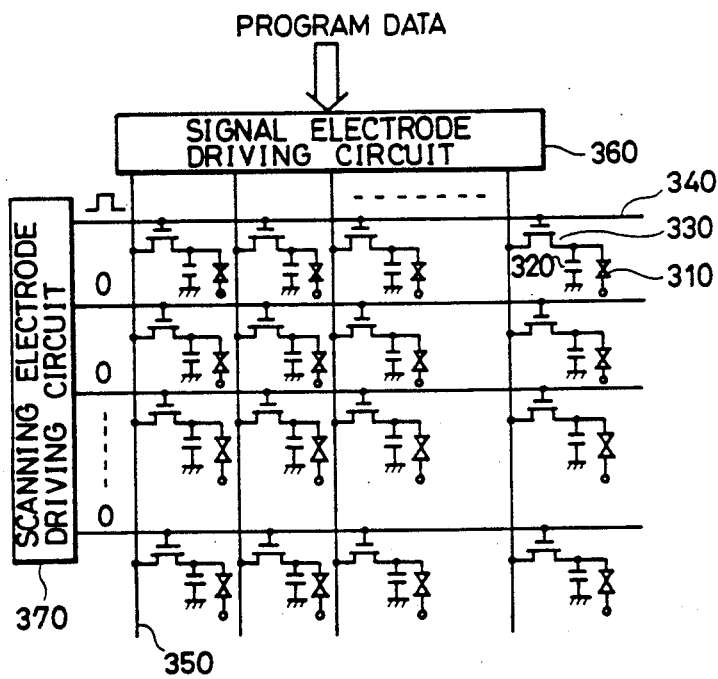
FIG. 17 illustrates exemplary specific structure of a liquid crystal shutter array shown in FIG. 14.

FIG. 17 shows a driving circuit for a liquid crystal shutter array 300 and an example of specific structure thereof. Referring to FIG. 17, each liquid crystal element includes a MOS transistor 330, a signal holding capacitor 320 and a TN type liquid crystal cell 310. Such liquid crystal cells are arrayed in one-to-one correspondence to respective photodiodes within a photodiode array of a semiconductor neural network, to form a matrix. A scanning electrode driving circuit 370 and a signal electrode driving circuit 360 are provided in order to drive such a liquid crystal array.

An output signal from the scanning electrode driving circuit 370 is transmitted through a gate bus 340. The gate bus 340 is connected to gates of MOS transistors of the same row, to select one row of the liquid crystal array. An output signal from the signal electrode driving circuit 360 is transmitted through a drain bus 350. The output of the signal electrode driving circuit 360 controls on-off of each liquid cell 310. The scanning electrode driving circuit 370 activates only one gate bus 340. Therefore, the liquid crystal cells 310 of one row can have respective on-off states controlled by data (corresponding to write data for the conventional RAM cells shown in FIG. 4) for defining ON and OFF states of the photodiodes, transmitted from the signal electrode driving circuit 360 onto the drain bus 350. The operation is now briefly described.

A gate bus 340 for one row is activated for selection by an activating signal from the scanning electrode driving circuit 370, and the MOS transistors 330 connected with the selected gate bus 340 enter ON states. Then the signal electrode driving circuit 360 transmits data, so that signal voltages are charged at the capacitors 320 through the MOS transistors 330 which are in the ON states. The liquid crystal cells 310 are driven by the voltages charged at the capacitors 320, to enter ON or OFF states. When the MOS transistors 330 are turned OFF, the signal voltages charged at the capacitors 320 are held until the same enter ON states again, and the held signal voltages are applied to the liquid crystal cells 310. Thus, the respective liquid crystal cells of the liquid crystal shutter array 300 are driven by the capacitors 320, so that the liquid crystal cells 310 are effectively statically driven by a driving method that alternating voltages are directly applied to the liquid crystal cells 310.

In the aforementioned structure which is called an active matrix system, it is necessary to alternatively drive respective pixels (liquid crystal cells). The potential of the signal applied from the signal electrode driving circuit 360 is changed in polarity every scanning cycle of the scanning electrode driving circuit 370 so that potentials applied to the liquid crystal cells are effectively made alternating voltages, thereby to implement the aforementioned alternating driving.

In place of the aforementioned liquid crystal shutter array structure of the active matrix system, a shutter of passive matrix structure of directly driving the liquid crystal cells 310 by the outputs of the scanning electrode driving circuit 370 and the signal electrode driving circuit 360 while utilizing no MOS transistors is also employable.

When a liquid crystal control electrical signal is supplied to the aforementioned liquid crystal shutter array 300, liquid crystal cells transmitting light and those transmitting no light are developed in the liquid crystal shutter array 300, thereby to obtain desired optical patterns. When a beam is supplied from a light source such as a fluorescent lamp onto the liquid crystal shutter 300, desired optical patterns are projected on the photodiode array 250 of the neural network. The photodiodes irradiated with the light are programmed in excitatory or inhibitory connection states, while those irradiated with no light are programmed in open states. Thus, it is possible to simultaneously program the connection states of all the photodiodes. After such connection states are completely programmed, input data and necessary control signals are applied as hereinabove described to drive the neural network, thereby to obtain desired output signals with respect to the input data.

In the aforementioned structure, the liquid crystal shutter cells 310 are scanned every row, and not driven at the same time. Therefore, the program states of the photodiode array may be changed before a subsequent scanning after completion of the first scan due to application of no light. However, it is possible to make the program states of the respective photodiodes unchanged by considering the aforementioned scan speed and charge storage amounts of the photodiodes and of the capacitors.

Figure 18:
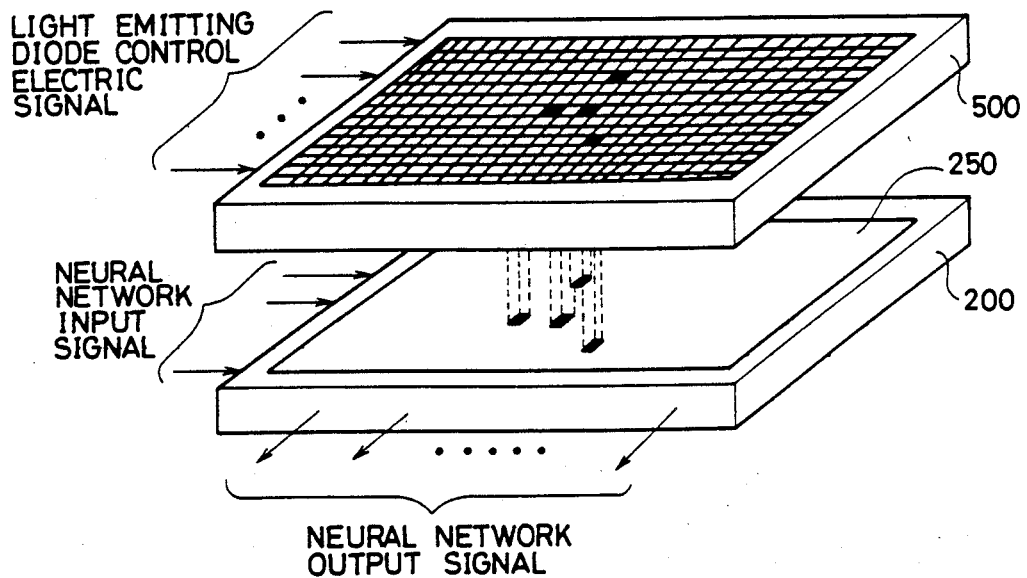
FIG. 18 schematically illustrates still another structure for programming coupling elements of the semiconductor neural network according to the present invention.
Figure 19:
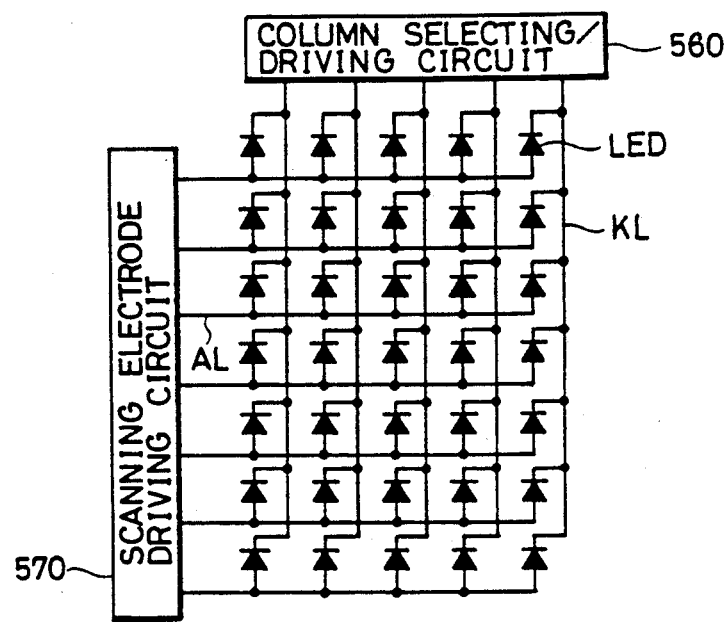
FIG. 19 illustrates exemplary specific structure of a light emitting diode array shown in FIG. 18.

FIG. 18 illustrates the structure of light applying means according to a further embodiment of the present invention. In the structure shown in FIG. 18, the liquid crystal shutter array is replaced by a light emitting diode array 500 serving as an emission source. FIG. 19 shows exemplary specific structure of the light emitting diode array 500. Light emitting diodes LED are arrayed in correspondence to respective photodiodes of a photodiode array 200, to form a matrix. A scanning electrode driving circuit 570 and a column selecting/driving circuit 560 are provided in order to drive the light emitting diodes LED. The light emitting diodes LED emit light when forward-biased. Thus, similarly to the case of the liquid crystal shutter array, the scanning electrode driving circuit 570 sequentially selects respective rows (anode lines AL) and the column driving circuit 560 supplies desired data to respective columns (cathode lines KL) with respect to the selected rows, so that corresponding light emitting diodes LED emit light. Thus, connection states of the respective photodiodes provided in the photodiode array 200 are programmed similarly to the case of the liquid crystal shutter array.

Figure 20:
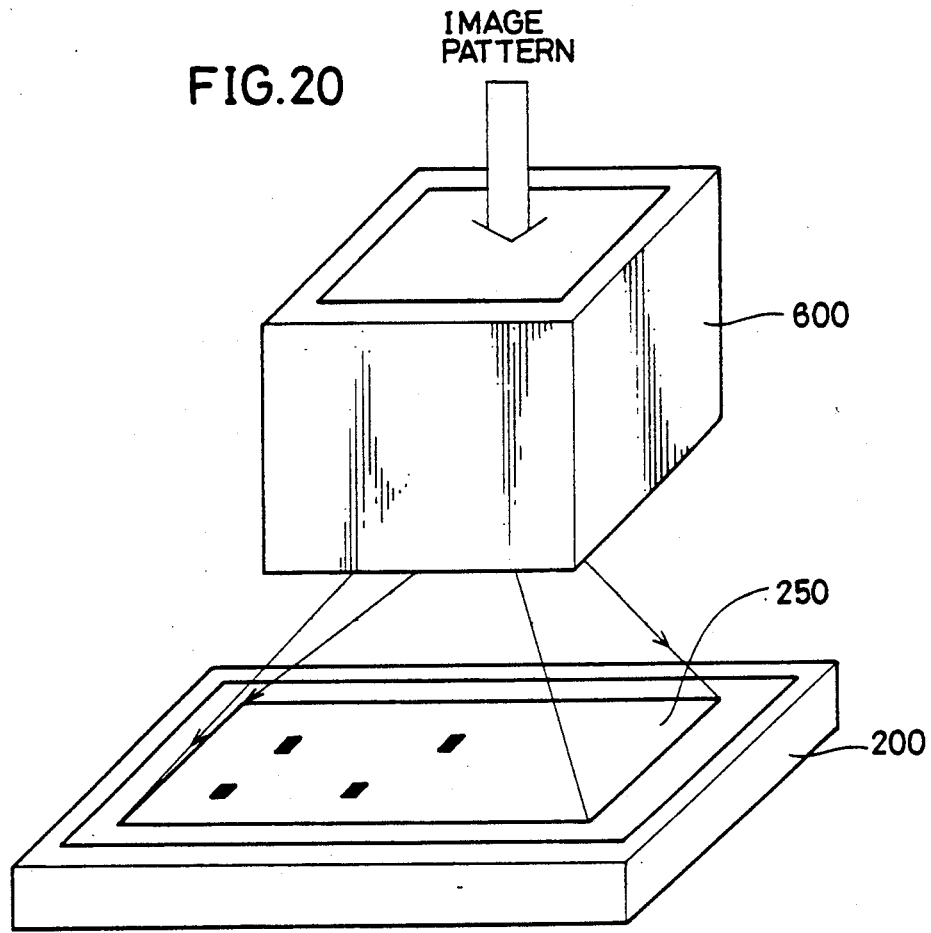
FIG. 20 illustrates further structure for programming coupling element of the semiconductor neural network according to the present invention.

While the programming optical pattern generation source requires scanning means in the structure shown in FIG. 14 or 18, FIG. 20 shows structure employing an optical system 600 which requires no such scanning means. The optical system 600 includes a lens, a reflecting mirror and the like, though not explicitly shown. Image patterns showing respective connection states of photodiodes are supplied to the optical system 600, and then applied to a photodiode array 250 through the optical system 600.

In fabrication of a semiconductor integrated circuit device, a reduction-type projection printing unit or the like is generally employed in patterning of the circuit or the like. Therefore, image pattern having a pattern of data corresponding to respective states of the photodiodes included in the photodiode array 250 can be readily applied to the photodiode array 250 by employing the optical system 600, which is similar in structure to such a printing unit. Thus, the respective photodiodes are irradiated or non-irradiated with light in accordance with the image pattern, whereby the states of all coupling elements (photodiodes) can be simultaneously programmed without employing any scanning means.

Since such an optical system 600 can be properly rotated, inclined or moved, it is possible to cope with rotation, deviation or the like of characters and figures, which cause problems in pattern recognition, when the semiconductor neural network is applied to a pattern recognizer.

Although the photodiodes are employed as elements whose connection states can be programmed by light in each of the aforementioned embodiments, such elements may be replaced by those whose conductance values are changed by exposure to light, such as photo transistors or photo conductors such as CdS. Further, an effect similar to the above can be attained by employing memories such as EPROMs, which can be programmed by light.

Although the coupling elements of the semiconductor neural network are structured in accordance with the Hopfield model in each of the aforementioned embodiments, the present invention is also applicable to a Boltzmann model, which has a learning algorithm of changing its connection state in response to output data. In this case, provided are a computing element for computing an image pattern inputted to a liquid crystal shutter array, a light emitting diode array, an optical system or the like in respective processes of data processing and structure of changing and correcting optical patterns (image patterns) by outputs from the computing element.

According to the present invention, as hereinabove described, photosensitive elements whose conductance values are changed by light are employed as coupling elements for a neural network so that no interconnection is required for programming connection states of the respective coupling elements, whereby the interconnection area is reduced to enable improvement in density and capacity of the neural network. Further, all the coupling elements can be simultaneously programmed, whereby it is possible to obtain a semiconductor neural network which can be programmed at a high speed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A semiconductor electronic circuit modeled on a vital nerve network, comprising:
   a plurality of data input lines to which input data are transmitted respectively;
   means provided in correspondence to respective said plurality of data input lines for amplifying potentials on corresponding said data input lines, said amplifying means deriving complementary amplified signals;
   a plurality of data output lines arrayed in a direction intersecting with said plurality of data input lines, said plurality of data output lines including a plurality of data output line pairs, said data output line pairs being provided in correspondence to respective said amplifying means and receiving outputs from corresponding said amplifying means; and
   a plurality of coupling elements provided at crosspoints of said data input lines and said data output lines for transmitting signals corresponding to potential levels on corresponding said data output lines onto corresponding said data input lines, states of respective said coupling elements being optically settable, said coupling elements coupling corresponding said data output lines to corresponding said data input lines in accordance with set states.

2. An electronic circuit in accordance with claim 1, wherein
   each of said coupling elements includes first and second photosensitive elements in correspondence to a complementary pair of first and second data output lines,
   said first photosensitive element is coupled to transmit a first source potential onto corresponding said data input line in response to the potential on said first data output line, and
   said second photosensitive element is coupled to transmit a second source potential onto said corresponding data input line in response to the potential on said second data output line.

3. An electronic circuit in accordance with claim 2, wherein
   each of said coupling elements includes a first insulated gate transistor which couples said first photosensitive element to corresponding said data input line in response to the potential on said first data output line and a second insulated gate transistor which couples said second photosensitive element to said corresponding data input line in response to the potential on said second data output line.

4. A semiconductor electronic circuit modeled on vital nerve cells, comprising:
   a plurality of data input lines to which input data are transmitted respectively;
   a plurality of internal data transmission lines arrayed to intersect with said data input lines;
   a plurality of coupling elements provided at crosspoints of said plurality of data input lines and said plurality of internal data transmission lines, states of said coupling elements being optically settable, respective ones of said plurality of coupling elements coupling corresponding ones of said data input lines and said internal data transmission lines with each other in accordance with optically set states; and
   a plurality of amplifying means provided in correspondence to respective ones of said plurality of internal data transmission lines for amplifying potentials on corresponding said internal data transmission lines.

5. An electronic circuit in accordance with claim 4, wherein
   each of said coupling elements includes first and second photosensitive elements,
   said first photosensitive element is coupled to transmit a first source potential onto corresponding said internal data transmission line in response to the potential on corresponding said data input line, and
   said second photosensitive element is coupled to transmit a second source potential onto corresponding said internal data transmission line in response to the potential on corresponding said input data line.

6. An electronic circuit in accordance with claim 5, wherein
   each of said coupling elements includes a first insulated gate field effect transistor of a first conductivity type for coupling said first photosensitive element to corresponding said internal data transmission line in response to the potential on corresponding said data transmission line and a second insulated field effect transistor of a second conductivity type for coupling said second photosensitive element to said corresponding internal data transmission line in response to the potential on corresponding said data input line.

7. An electronic circuit in accordance with claim 4, wherein
   each of said data input lines has first and second signal lines on which complementary data are transmitted, and
   each of said coupling elements includes:
   a first coupling element for coupling said first signal line to said internal data transmission line, said first coupling element including a first photosensitive element for transmitting a first source potential, and
   a second coupling element for coupling said second signal line to said internal data transmission line, said second coupling element including a second photosensitive element for transmitting a second source potential.

8. An electronic circuit in accordance with claim 4 wherein
   each of said internal data transmission lines has first and second data transmission lines,
   each of said data input lines has first and second signal lines on which complementary input data are transmitted, and
   each of said coupling elements includes:
   a first coupling element for coupling said first signal line and said first data transmission line with each other, said first coupling element including a first photosensitive element for supplying a first source potential, and
   a second coupling element for coupling said second signal line and said second data transmission line with each other, said second coupling element including a second photosensitive element for supplying a second source potential.

9. An electronic circuit in accordance with claim 8, wherein
   said first source potential and said second source potential are different from each other.

10. An electronic circuit in accordance with claim 8, wherein
    said first source potential and said second source potential are identical to each other.

11. An electronic circuit in accordance with claim 4, wherein
    each of said internal data transmission lines includes first and second data transmission lines, and
    said amplifying means includes means for differentially amplifying potentials on said first and second data transmission lines.

12. An electronic circuit in accordance with claim 4, wherein
    each of said data input lines has a first signal line and a second signal line, said electronic circuit further including means provided for said second signal line and being activated in response to an activating signal for inverting input data and transmitting the same onto said second signal line, whereby complementary signals are transmitted to said first signal line and said second signal line as input data.

13. A semiconductor electronic circuit modeled on a vital nerve network, comprising:
    a plurality of data input lines onto which input data are transmitted respectively;
    a plurality of data output lines arranged in a direction intersecting with said plurality of data input lines; and
    a plurality of coupling elements provided at crosspoints of said data input lines and said data output lines, states of respective coupling elements being optically settable, each said coupling element including means for transferring signal potential from one data line of an associated input data line and an associated output data line to the other of the associated input data line and the associated output data line, the transferred signal potential being determined responsive to an optically set state of the coupling element and the signal potential on said on data line.

* * * * *